United States Patent
Miltonberger et al.

(10) Patent No.: US 7,685,279 B2
(45) Date of Patent: Mar. 23, 2010

(54) GEO-LOCATION AND GEO-COMPLIANCE UTILIZING A CLIENT AGENT

(75) Inventors: Thomas W. Miltonberger, San Jose, CA (US); Kaelin Lee Colclasure, Morgan Hill, CA (US); David Charles Naffziger, Somerville, MA (US); Tobias Speckbacher, Redwood City, CA (US); Stefano Paoletti, Oakland, CA (US)

(73) Assignee: Quova, Inc., Mountain View, CA (US)

( * ) Notice: Subject to any disclaimer, the term of this patent is extended or adjusted under 35 U.S.C. 154(b) by 1031 days.

(21) Appl. No.: 11/073,149

(22) Filed: Mar. 4, 2005

(65) Prior Publication Data

US 2006/0010252 A1    Jan. 12, 2006

Related U.S. Application Data

(60) Provisional application No. 60/550,300, filed on Mar. 4, 2004.

(51) Int. Cl.
G06F 15/173    (2006.01)
(52) U.S. Cl. .................. 709/225; 709/220; 709/223; 709/228; 370/242; 370/392
(58) Field of Classification Search ............... 709/220, 709/223–228; 370/392, 242, 312
See application file for complete search history.

(56) References Cited

U.S. PATENT DOCUMENTS

| 4,939,726 | A | 7/1990 | Flammer et al. |
| 5,042,032 | A | 8/1991 | Dighe et al. |
| 5,115,433 | A | 5/1992 | Baran et al. |
| 5,231,631 | A | 7/1993 | Buhrke |
| 5,291,550 | A | 3/1994 | Levy |
| 5,418,713 | A | 5/1995 | Allen |
| 5,421,024 | A | 5/1995 | Faulk, Jr. |
| 5,488,608 | A | 1/1996 | Flammer |
| 5,490,252 | A | 2/1996 | Macera et al. |

(Continued)

FOREIGN PATENT DOCUMENTS

EP    1039265    9/2000

(Continued)

OTHER PUBLICATIONS

"U.S. Appl. No. 10/685,692 Advisory Action mailed Dec. 21, 2005", 5 pgs.

(Continued)

Primary Examiner—Phuoc Nguyen
(74) Attorney, Agent, or Firm—Schwegman Lundberg & Woessner, P.A.

(57) ABSTRACT

A system includes an interface to receive network geolocation information associated with a first party to a network session between the first entity and a second entity, coupled via a network. The network geolocation information is determined utilizing a network address of the first entity. The system further includes a decision logic module to obtain supplemental information concerning the first entity by harvesting the supplemental information locally at the first entity. The decision logic module is further to generate an assessment regarding compliance with a geolocation policy defined in connection with access to the second entity, the assessment being generated utilizing the network geolocation information and the supplemental information.

20 Claims, 4 Drawing Sheets

U.S. PATENT DOCUMENTS

| | | | |
|---|---|---|---|
| 5,493,689 A | 2/1996 | Waclawsky | |
| 5,636,276 A | 6/1997 | Brugger | |
| 5,659,596 A | 8/1997 | Dunn | |
| 5,664,107 A | 9/1997 | Chatwani et al. | |
| 5,680,390 A | 10/1997 | Robrock, II | |
| 5,687,319 A | 11/1997 | Cook et al. | |
| 5,734,651 A | 3/1998 | Blakeley | |
| 5,734,823 A | 3/1998 | Saigh | |
| 5,734,891 A | 3/1998 | Saigh | |
| 5,777,989 A | 7/1998 | McGarvey | |
| 5,794,217 A | 8/1998 | Allen | |
| 5,848,373 A | 12/1998 | DeLorme et al. | |
| 5,862,325 A | 1/1999 | Reed et al. | |
| 5,862,339 A | 1/1999 | Bonnaure et al. | |
| 5,870,561 A | 2/1999 | Jarvis et al. | |
| 5,878,126 A | 3/1999 | Velamuri et al. | |
| 5,884,038 A | 3/1999 | Kapoor | |
| 5,913,036 A | 6/1999 | Brownmiller | |
| 5,930,474 A | 7/1999 | Dunworth | |
| 5,937,163 A | 8/1999 | Lee | |
| 5,944,787 A | 8/1999 | Zoken | |
| 5,944,790 A | 8/1999 | Levy | |
| 5,948,061 A | 9/1999 | Merriman et al. | |
| 5,978,845 A | 11/1999 | Reisacher | |
| 5,994,787 A | 11/1999 | Hibino | |
| 6,009,081 A | 12/1999 | Wheeler et al. | |
| 6,012,052 A | 1/2000 | Altschuler et al. | |
| 6,012,088 A | 1/2000 | Li et al. | |
| 6,012,090 A | 1/2000 | Chung | |
| 6,014,634 A | 1/2000 | Scroggie et al. | |
| 6,035,332 A | 3/2000 | Ingrassia, Jr. et al. | |
| 6,091,959 A | 7/2000 | Souissi | |
| 6,130,890 A | 10/2000 | Leinwand et al. | |
| 6,151,631 A | 11/2000 | Ansell | |
| 6,154,172 A | 11/2000 | Piccionelli et al. | |
| 6,154,745 A | 11/2000 | Kari et al. | |
| 6,167,259 A | 12/2000 | Shah | |
| 6,185,598 B1 | 2/2001 | Farber et al. | |
| 6,192,312 B1 | 2/2001 | Hummelsheim | |
| 6,236,365 B1 | 5/2001 | LeBlanc et al. | |
| 6,243,746 B1 | 6/2001 | Sondur | |
| 6,243,749 B1 | 6/2001 | Sitaraman | |
| 6,249,252 B1 | 6/2001 | Dupray | |
| 6,259,701 B1 | 7/2001 | Shur | |
| 6,266,607 B1 | 7/2001 | Meis | |
| 6,272,150 B1 | 8/2001 | Hrastar | |
| 6,272,343 B1 | 8/2001 | Pon | |
| 6,275,470 B1 | 8/2001 | Ricciulli | |
| 6,285,748 B1 | 9/2001 | Lewis | |
| 6,286,047 B1 | 9/2001 | Ramanathan | |
| 6,324,585 B1 | 11/2001 | Zhang | |
| 6,338,082 B1 | 1/2002 | Schneider | |
| 6,343,290 B1 | 1/2002 | Cossins et al. | |
| 6,347,078 B1 | 2/2002 | Narvaez-Guarnieri | |
| 6,356,929 B1 | 3/2002 | Gall | |
| 6,389,291 B1 | 5/2002 | Pande | |
| 6,415,064 B1 | 7/2002 | Oh | |
| 6,415,323 B1 | 7/2002 | McCanne et al. | |
| 6,421,726 B1 | 7/2002 | Kenner | |
| 6,425,000 B1 | 7/2002 | Carmello | |
| 6,442,565 B1 | 8/2002 | Tyra | |
| 6,466,940 B1 | 10/2002 | Mills | |
| 6,477,150 B1 | 11/2002 | Maggenti | |
| 6,484,143 B1 | 11/2002 | Swildens et al. | |
| 6,487,538 B1 | 11/2002 | Gupta | |
| 6,505,201 B1 | 1/2003 | Haitsuka et al. | |
| 6,513,061 B1 | 1/2003 | Ebata et al. | |
| 6,523,064 B1 | 2/2003 | Akatsu et al. | |
| 6,526,450 B1 | 2/2003 | Zhang | |
| 6,542,739 B1 | 4/2003 | Garner | |
| 6,665,611 B1 | 12/2003 | Oran | |
| 6,665,715 B1 | 12/2003 | Houri | |
| 6,674,745 B1 | 1/2004 | Schuster | |
| 6,684,158 B1 | 1/2004 | Garin | |
| 6,684,250 B2 | 1/2004 | Anderson et al. | |
| 6,757,740 B1 | 6/2004 | Parekh | |
| 6,904,449 B1* | 6/2005 | Quinones | 709/203 |
| 6,947,978 B2 | 9/2005 | Huffman et al. | |
| 7,007,228 B1 | 2/2006 | Carro | |
| 7,062,572 B1 | 6/2006 | Hampton | |
| 7,072,963 B2 | 7/2006 | Anderson et al. | |
| 7,100,204 B1* | 8/2006 | Myllymaki et al. | 726/22 |
| 7,472,172 B2 | 12/2008 | Anderson et al. | |
| 2002/0007374 A1 | 1/2002 | Marks | |
| 2002/0078367 A1 | 6/2002 | Lang et al. | |
| 2002/0099955 A1* | 7/2002 | Peled et al. | 713/200 |
| 2002/0143991 A1 | 10/2002 | Chow | |
| 2002/0199018 A1 | 12/2002 | Diedrich et al. | |
| 2003/0065763 A1 | 4/2003 | Swildens et al. | |
| 2003/0110293 A1 | 6/2003 | Friedman | |
| 2003/0125021 A1 | 7/2003 | Tell et al. | |
| 2003/0212909 A1* | 11/2003 | Chandrashekhar et al. | 713/201 |
| 2004/0010571 A1* | 1/2004 | Hutchinson et al. | 709/220 |
| 2004/0068582 A1 | 4/2004 | Anderson et al. | |
| 2004/0078367 A1 | 4/2004 | Anderson et al. | |
| 2004/0078489 A1 | 4/2004 | Anderson et al. | |
| 2004/0078490 A1* | 4/2004 | Anderson et al. | 709/245 |
| 2004/0103315 A1* | 5/2004 | Cooper et al. | 713/201 |
| 2005/0004978 A1 | 1/2005 | Reed et al. | |
| 2005/0138144 A1 | 6/2005 | Sethi | |
| 2005/0198265 A1* | 9/2005 | Veprek et al. | 709/224 |
| 2006/0025158 A1 | 2/2006 | Leblanc et al. | |
| 2006/0128397 A1 | 6/2006 | Choti et al. | |
| 2006/0212601 A1 | 9/2006 | Hampton | |
| 2006/0242072 A1* | 10/2006 | Peled et al. | 705/51 |

FOREIGN PATENT DOCUMENTS

| | | |
|---|---|---|
| WO | WO-9613108 | 5/1996 |
| WO | WO-9934305 | 7/1999 |
| WO | WO-0022495 | 4/2000 |
| WO | WO-0022495 A2 | 4/2000 |
| WO | WO-0029979 | 5/2000 |
| WO | WO-0067450 | 11/2000 |
| WO | WO-0157696 | 8/2001 |
| WO | WO-0175632 | 10/2001 |
| WO | WO-0175698 | 10/2001 |
| WO | WO-0213459 | 2/2002 |
| WO | WO-0217139 | 2/2002 |
| WO | WO-2005086681 A2 | 9/2005 |
| WO | WO-2005086681 A3 | 9/2005 |

OTHER PUBLICATIONS

"U.S. Appl. No. 10/685,692 Final Office Action mailed Aug. 25, 2004", 30 pgs.

"U.S. Appl. No. 10/685,692 Final Office Action mailed Sep. 21, 2005", 16 pgs.

"U.S. Appl. No. 10/685,692 Non Final Office Action mailed May 3, 2005", 11 pgs.

"U.S. Appl. No. 10/685,692 Response filed Jan. 25, 2005 to Final Office Action mailed Aug. 25, 2004", 19 pgs.

"U.S. Appl. No. 10/685,692 Response filed Jun. 23, 2005 to Non Final Office Action mailed May 3, 2005", 10 pgs.

"U.S. Appl. No. 10/685,692 Response filed Nov. 21, 2005 to Final Office Action mailed Sep. 21, 2005", 16 pgs.

"U.S. Appl. No. 10/685,991 Non Final Office Action mailed Aug. 24, 2004", 40 pgs.

"U.S. Appl. No. 10/685,991 Notice of Allowance mailed May 6, 2005", 8 pgs.

"U.S. Appl. No. 10/685,991 Notice of Allowance mailed Sep. 19, 2005", 17 pgs.

"U.S. Appl. No. 10/685,991 Response filed Jan. 24, 2005 to Non Final Office Action mailed Aug. 24, 2004", 23 pgs.

"U.S. Appl. No. 10/686,102 Advisory Action mailed Jan. 31, 2006", 3 pgs.

"U.S. Appl. No. 10/686,102 Advisory Action mailed Feb. 13, 2007", 3 pgs.

"U.S. Appl. No. 10/686,102 Final Office Action mailed Oct. 19, 2005", 14 pgs.

"U.S. Appl. No. 10/686,102 Final Office Action mailed Nov. 29, 2006", 12 pgs.

"U.S. Appl. No. 10/686,102 Final Office Action mailed Dec. 11, 2007", FOAR,11 pgs.

"U.S. Appl. No. 10/686,102 Non Final Office Action mailed May 4, 2005", 11 pgs.

"U.S. Appl. No. 10/686,102 Non Final Office Action mailed May 22, 2006", 11 pgs.

"U.S. Appl. No. 10/686,102 Non Final Office Action mailed Jun. 1, 2007", 12 pgs.

"U.S. Appl. No. 10/686,102 Non Final Office Action mailed Aug. 25, 2004", 31 pgs.

"U.S. Appl. No. 10/686,102 Response filed Jan. 24, 2005 to Non Final Office Action mailed Aug. 25, 2004", 17 pgs.

"U.S. Appl. No. 10/686,102 Response filed Jul. 27, 2005 to Non Final Office Action mailed May 4, 2005", 13 pgs.

"U.S. Appl. No. 10/686,102 Response filed Aug. 22, 2006 to Non Final Office Action mailed May 22, 2006", 11 pgs.

"U.S. Appl. No. 10/686,135 Non Final Office Action mailed Jun. 27, 2007", 22 pgs.

"U.S. Appl. No. 10/686,135, Final Office Action Mailed Nov. 27, 2007", 11 pgs.

"U.S. Appl. No. 11/397,527, Response filed Jan. 10, 2006 Final Office Action mailed Sep. 21, 2005", 5 pgs.

"International Application Serial No. 01926668.3-2001, European Search Report mailed Jan. 14, 2005", 4 pgs.

"International Application Serial No. 01926668.3-2201, Office Action mailed Jan. 18, 2005", 1 pgs.

"International Application Serial No. 01926668.3-2201, Office Action mailed Nov. 16, 2005", 4 pgs.

"International Application Serial No. 01926668.3-2201, Office Action mailed Mar. 10, 2005", 5 pgs.

"International Application Serial No. 01926668.3-2201, Office Action mailed Jun. 9, 2006", 6 pgs.

"International Application Serial No. 01926668.3-2201, Response filed Jan. 19, 2007 to Office Action mailed Jan. 16, 2007", 1 pgs.

"International Application Serial No. 01926668.3-2201, Response filed Oct. 20, 2005 to Office Action mailed Mar. 10, 2005", 55 pgs.

"International Application Serial No. 01926668.3-2201, Response filed Nov. 16, 2005 to Office Action mailed Mar. 10, 2005", 4 pgs.

"International Application Serial No. 01926668.3-2201, Response filed Feb. 14, 2005 to Office Action mailed Jan. 18, 2005", 1 pgs.

"International Application Serial No. 2001253189, Response filed Jun. 2, 2004 to Examiner's Report mailed Feb. 20, 2004", 19 pgs.

"International Application Serial No. PCT/US01/11163, International Search Report mailed Aug. 20, 2001", 6 pgs.

"International Application Serial No. PCT/US05/07034, International Search Report mailed Jul. 13, 2006", 5 pgs.

"International Application Serial No. PCT/US05/07034, Written Opinion mailed Jul. 13, 2006", 4 pgs.

"International Application Serial No. PCT/US2005/007034, Preliminary Report on Patentability mailed Sep. 14, 2006", 5 pgs.

"IP Network Address Mapping", http://www.unm.edu/~network/presentations/course/chap7/sld027.htm.

Carter, D., et al., "Automated Geolocation Network for use in GPS-Degraded Environments", *IEEE*, (2004),690-697.

"The UUCP Mapping Project", *Academ Consulting Services* http://www.academ.com/academ/maps.html, 1 page, Oct. 1999.

Author Unknown, "Geographic Location Representation in DNS", http://www.bovine.net /~JLAWSON/HMC/DNS/LOCATION.HTML, (Mar. 28, 2002),1-3.

Buyukkokten, Orkut, "Exploiting Geographical Location Information of Web Pages", 1-6, 1999.

Cooney, Ron, "Subnet Addressing", http://www.networkcomputing.com/unixworld/utoria1/001.html, (2001), 7 pages.

Davis, C, "A Means for Expressing Location Information in the Domain Name System", *RFC 1876—Internet RFC/STD/FYI/BCP Archives*, (Jan. 1996), 1-18.

Debellis, Matthew, "Digital Envoy greets $1.1 million", http://www.redherring.com/vc/2000/0229/vc-digitalenvoy022900.html, (Feb. 29, 2000), 3 pages.

Digital Envoy, "SPOT (Systematic Position Online Targetter)", *Digital Envoy—Product and Services*, http://web.archive.org/web/19991127165432/http://digitalenvoy.com/products/products.htm,(Nov. 27, 1999), 1 page.

Digital Island, "Content Delivery Services: Footprint Streaming Solutions", *Digital Island, Inc.*, 4 pages, Jun. 1999.

Digital Island, "TraceWare White Paper", *Digital Island, Inc.*, (Jun. 1999), 1-8.

Dodge, M, et al., "Where on Earth is the Internet? An Empirical Investigation of the Spatial Patterns of Internet "Real-Estate" in Relation to Geospace in the United Kingdom", *Centre for Advanced Spatial Analysis, University of College London* http://www.geog.ucl.ac.uk/casa/martin/internetspace/paper/telecom.html, (Mar. 28, 2002), 1-15.

Dommety, Gopal, "Potential Networking Applications of Global Positioning Systems (GPS)", *Department of Computer and Information Science, Ohio State University*, Columbus, OH, 1-40, Apr. 1996.

Eastlake, "Domain Name System Security Extension", *The Internet Society*, (Mar. 1999), 1-42.

Farrell, C, et al., "DNS Encoding of Geographical Location", *RFC 1712—Internet RFC/STD/FYI/BCP Archives*, (Nov. 1994), 1-7.

Hamilton, Martin, "Uniform Resource Identifiers & the Simple Discovery Protocol", *Department of Computer Studies, Loughborough University of Technology*, Ashby Road, Loughborough, LUT CS-TR 985,(Jun. 20, 1995), 1-23.

Harrenstein, et al., "NICNAME/WHOIS", *Network Working Group*, (Oct. 1985), 1-4.

Harris, Nicole, "Digital Envoy Offers a Way to 'Geo-Target' Web Surfers", *The Wall Street Journal*, (referrence was printed from The Wall Street Journal web site),(Apr. 12, 2001), 3 pages.

Imielinski, Tomasz, "Geographic Addressing, Routing, and Resource Discovery with the Global Positioning System", *Computer Science Department, Rutgers*, Piscataway, NJ, (Oct. 19, 1996), 1-10.

Imielinski, Tomasz, et al., "GPS-Based Addressing and Routing", *Computer Science Department, Rutgers*, Piscataway, NJ, (Aug. 9, 1996), 1-35.

Imielinski, et al., "GPS-Based Geographic Addressing, Routing and Resource Discovery with the Global Positioning System", *Computer Science Department, Rutgers State University*, Piscataway, NJ 088555, (Oct. 19, 1996), 7 pages.

JEVANS.COM, "Mapping The Internet", http://www.jevans.com/pubnetmap.html, (Oct. 16, 1995), 1-4.

JOHNSCLOSET.NET, "What's A Netmask? And Why Do I Need One?", http://www.johnscloset.net/primer/subnet.html, (Apr. 21, 2000), 3 pages.

Kessler, et al., "A Primer on Internet and TCP/IP Tools and Utilities", *Network Working Group Hill Associates, Inc.*, (Jun. 1997), 1-46.

Lambert, John, "Subnet Masking Definition: What is subnet masking, and what it is used for?", http://www.exabyte.net/lambert/subnet/subnet_masking_definition.htm, (1999), 2 pages.

Lamm, Stephen, et al., "Real-Time Geographic Visualization of World Wide Web Traffic", *WWW Journal*, Issue 3 http://www.w3journal.com/3/s3.lamm.html, 14 pages, 1996.

May, M, European Search Report for Application No. 01926668.3-2201-US0111163, (Jan. 14, 2005), 4 pages.

McCurley, Kevin, "Geospatial Mapping and Navigation of the Web", *IBM Almaden Research Center*, San Jose, CA, 221-229, May 2001.

Moore, David, et al., "Where in the world is netgeo.caida.org?", *INET '00*, (Jul. 18-21, 2000), 1-13.

Navas, Julio C., "Geographic Routing Project Description", http://www.research.rutgers.edu/~navas/dataman/abstract.html, (Dec. 18, 1998), 1-3.

Navas, Julio C., et al., "On reducing the computational cost of Geographic Routing", *Technical Report (DCS-TR-408). Rutgers University Computer Science*, (Jan. 24, 2000), 1-28.

Padmanabhan, Venkata, et al., "Determining the Geographic Location of Internet Hosts", *Technical Report—MSR-TR-2000-*

110—*Microsoft Research, University of California Berkley*, www.research.microsoft.com-padmanab,(Nov. 2000), 1-17.

Parang, K, et al., "Novel Approaches For Designing 5'-0-Ester Prodrugs of 3'-Azido-2', 3'-Dideoxythymidine (AZT)", *Current Medicinal Chemistry*, vol. 7(10), Bentham Science Publishers,(Oct. 2000), 995-1039.

Quarterman, John, et al., "Internet Interaction Pinged and Mapped", *Proceedings of INET '94*, (1994), 1-11.

Quova, "Prominent Internet Industry Executives Launch Quova . . . Provide Internet Intelligence to E-Businesses", http://www.quova.com/pressrelease.cfm?ID=1, (right side of text cut off),(Sep. 18, 2000), 2 pages.

Quova, "Quova Brings Geography to the Internet with Introduction of Geopoint 2.0", http://www.quova.com/pressrelease.cfm?ID=5, (right side of text cut off),(Feb. 21, 2001), 3 pages.

Raz, Uri, "How to Find a Host's Geographical Location?", http://www.private.org.il/IP2geo.html, 3 pages, Mar. 28, 2002.

Schwartz, Michael, "Applying an information gathering architecture to Netfind: a white pages tool for a changing and growing Internet", *IEEE/ACM Transactions on Networking*, 2(5), (Oct. 1994), 426-439.

Shiode, Narushige, "Analysing the Geography of Internet Address Space", http://www.geog.ucl.ac.uk/casa/martin/internetspace/, (Mar. 16, 1998),3 pages.

Subramanian, Lakshminarayanan, et al., "Geographic Properties of Internet Routing: Analysis and Implications", *Technical Report—MSR-TR-2001-89—Microsoft*, (Sep. 2001), 1-12.

Webopedia, "DHCP", http://www.pcwebopedia.com/TERM/DHCP.html, 2 pages.

Webopedia, "ICMP", http://www.pcwebopedia.com/TERM/I/ICMP.html, 2 pages.

Wizzard.com, "Using IP Subnet Masks", http://www.wizard.com/users/baker/public_html/Network/Subnet.html, 1 page, Oct. 20, 2001.

Wooley, Scott, "We Know Where You Live", *Forbes Magazine* http://www.forbes.com/forbes/2000/1113/6613332a.html;$sessionid$Q4DBX0QAACP0, (printed from Forbes.com website),(Nov. 13, 2000), 2 pages.

Yerushalmi, Yoav, U.S. Appl. No. 60/226,405 (filing date unknown), Oct. 18, 2000.

U.S. Appl. No. 10/686,102 Notice of Allowance mailed Oct. 17, 2008, 8 pgs.

U.S. Appl. No. 10/686,102, Response filed Feb. 11, 2008 to Final Office Action mailed Dec. 11, 2007, 14 pgs.

U.S. Appl. No. 10/686,102 Notice of Allowance mailed Jun. 9, 2008, 9 pgs.

U.S. Appl. No. 10/686,135, Response filed Oct. 21, 2008 to Non-Final Office Action mailed Jul. 21, 2008, 12 pgs.

U.S. Appl. No. 10/686,135, Non-Final Office Action mailed Jul. 21, 2008, 12 pgs.

U.S. Appl. No. 10/686,135, Response filed Jan. 25, 2008 to Final Office Action mailed Nov. 27, 2007, 11 pgs.

"U.S. Appl. No. 10/686,135, Response filed Apr. 16, 2009 to Final Office Action mailed Jan. 8, 2009", 14 pgs.

"U.S. Appl. No. 10/686,135, Final Office Action mailed Jan. 8, 2009", 13 pgs.

"U.S. Appl. No. 10/686,135, Notice of Allowance mailed Jul. 13, 2009", 10 pgs.

"U.S. Appl. No. 10/686,135, Supplemental Notice of Allowability Mailed Aug. 25, 2009", 3 Pgs.

"European Application Serial No. 01926668.3, Office Action Mailed Jul. 27, 2009", 7 pgs.

"SPOT(Systematic Position Online Targetter)", XP002298987, (Nov. 27, 1999), 1 pg.

* cited by examiner

GEO-LOCATION AND GEO-COMPLIANCE UTILIZING A CLIENT AGENT

CROSS REFERENCE TO RELATED APPLICATIONS

This application claims the benefit of U.S. Provisional Application Ser. No. 60/550,300 filed Mar. 4, 2004, which is incorporated herein by reference.

TECHNICAL FIELD

The present application relates generally to the technical field of geolocation and, in one exemplary embodiment, to methods and systems to facilitate geocompliance utilizing a client agent.

BACKGROUND

Geography plays a fundamental role in everyday life and effects, for example, of the products that consumers purchase, shows displayed on TV, and languages spoken. Information concerning the geographic location of a networked entity, such as a network node, may be useful for any number of reasons.

Geographic location may be utilized to infer demographic characteristics of a network user. Accordingly, geographic information may be utilized to direct advertisements or offer other information via a network that has a higher likelihood of being the relevant to a network user at a specific geographic location.

Geographic information may also be utilized by network-based content distribution systems as part of a Digital Rights Management (DRM) program or an authorization process to determine whether particular content may validly be distributed to a certain network location. For example, in terms of a broadcast or distribution agreement, certain content may be blocked from distribution to certain geographic areas or locations.

Content delivered to a specific network entity, at a known geographic location, may also be customized according to the known geographic location. For example, localized news, weather, and events listings may be targeted at a network entity where the geographic location of the networked entity is known. Furthermore content may be presented in a local language and format.

Knowing the location of network entity can also be useful in combating fraud. For example, where a credit card transaction is initiated at a network entity, the location of which is known and far removed from a geographic location associated with an owner of credit card, a credit card fraud check may be initiated to establish the validity of the credit card transaction.

SUMMARY

According to an example embodiment, there is provided a system including an interface to receive network geolocation information associated with a first party to a network session between the first entity and a second entity, coupled via a network. The network geolocation information is determined utilizing a network address of the first entity. The system further includes a decision logic module to obtain supplemental information concerning the first entity by harvesting the supplemental information locally at the first entity. The decision logic module is further to generate an assessment regarding compliance with a geolocation policy defined in connection with access to the second entity, the assessment being generated utilizing the network geolocation information and the supplemental information.

In one example embodiment, the first entity may be a client machine hosting a client application, and the second entity may be a server machine hosting a server application, the client application communicating with the server application using the network session.

The supplemental information may include, for example, at least one of a group of information types including a machine setting on the client machine, a communication setting with respect the network session between the client machine and the server machine, and network measurements pertaining to the network session between the client machine and the server machine.

The geolocation policy may, in one example embodiment, be defined by an operator of the second entity.

The decision logic module may, in one example embodiment, obtain further supplemental information, concerning the first entity, from the second entity and may generate the assessment utilizing the further supplemental information.

The further supplemental information may, for example, include information concerning a user associated with the first entity, provided to the second entity by the first entity and stored by the second entity. In one example embodiment, the further supplemental information they include at least one of a group of information types including user login information, user account information and network session information received at the second entity from the first entity.

The interface may also, in one example embodiment, be configured to receive the network geolocation information from an external geolocation service to which the network address of the first entity has been communicated. The interface may also receive constraints, from the second entity, in connection with the harvesting of the supplemental information locally at the first entity, and the decision logic may harvest the supplemental information locally at the first entity subject to the constraints.

Other features of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A method and system to estimate geographical location of Internet users are described. Some applications for this capability include online fraud detection, prevention of online identity theft, and determining the geographical compliance of a user for access to information or electronic content and access to regulated applications such as Internet gaming. In the following description, for purposes of explanation, numerous specific details are set forth in order to provide a thorough understanding of an embodiment. It will be evident, however, to one skilled in the art that the present invention may be practiced without these specific details. An exemplary embodiment of the present invention is discussed below in connection with Internet gaming operations. It will nonetheless be appreciated that the present invention finds application beyond this exemplary usage.

When a user requests a service provided by an Internet site, it may be necessary for the Internet site host to assess geographic compliance (geocompliance) of the user, or determine the geographic location of the user in order to, for example calculate applicable taxes. For example, a legitimate online gaming operation may be required to know and validate the age of the user as satisfying minimum age requirements and to know and validate the current geographical location of the user in order to enforce the local regulations applicable to the geographical area.

A geocompliance process, in one embodiment, may include two phases: registration process and log in session. The registration process may be used to collect information about the user, create a user account, and authorize the user account for specific online activities. The log in session is where the user has access to specific capabilities of the gaming site, including, for example, placing wagers, and withdrawing funds. In both situations, it may be necessary to determine the geographical location of the user.

There are technologies that can be used to determine the current location of the user when they are accessing an Internet site, such as, for example, Internet protocol (IP) geolocation. IP geolocation may refer to a set of techniques that determine the location of a web visitor based on their associated IP address. Each computer that is connected directly to the public Internet has a unique (though possibly dynamic) IP address. This IP address is used, much like a phone number, to route information to and from that computer to other computers on the Internet. However, unlike a phone number, an IP address does not contain geographic location; there is not a country code, area code, or prefix structure to IP addresses. IP geolocation techniques rely on a variety of information and measurements about the physical and logical infrastructure of the Internet. However, the geographical location of an IP address does not always correspond to the geographical location of an Internet user. For example, a user may be an America Online (AOL) user. A determination of an AOL user location is severely restricted. A user may also be dialing around, using a proxy, a firewall, or using a remote desktop access application, which may obscure the actual location of the user.

In one embodiment, a method and system are provided that utilize multiple sources to obtain information that may be useful in determining the geolocation information of a user. The IP geolocation techniques may still be used, but an exemplary system may also utilize information such as the user's computer settings (e.g., the time/zone settings and the language setting), the user's registration information, as well as information contained in the HTTP header associated with the Internet user's request. For example, user-supplied information in the registration process, such as identification and payment methods, can be used to determine the usual residency of the user. While this information does not reveal the current location of the user, it can be used as part of the overall process of determining the location of the user and the certainty (e.g., embodied in a reliability indicator) that the determined location is correct. For example, the user location estimated by means of IP geolocation may be compared with the user's account information and the reliability indicator may be adjusted accordingly.

Figure 1:
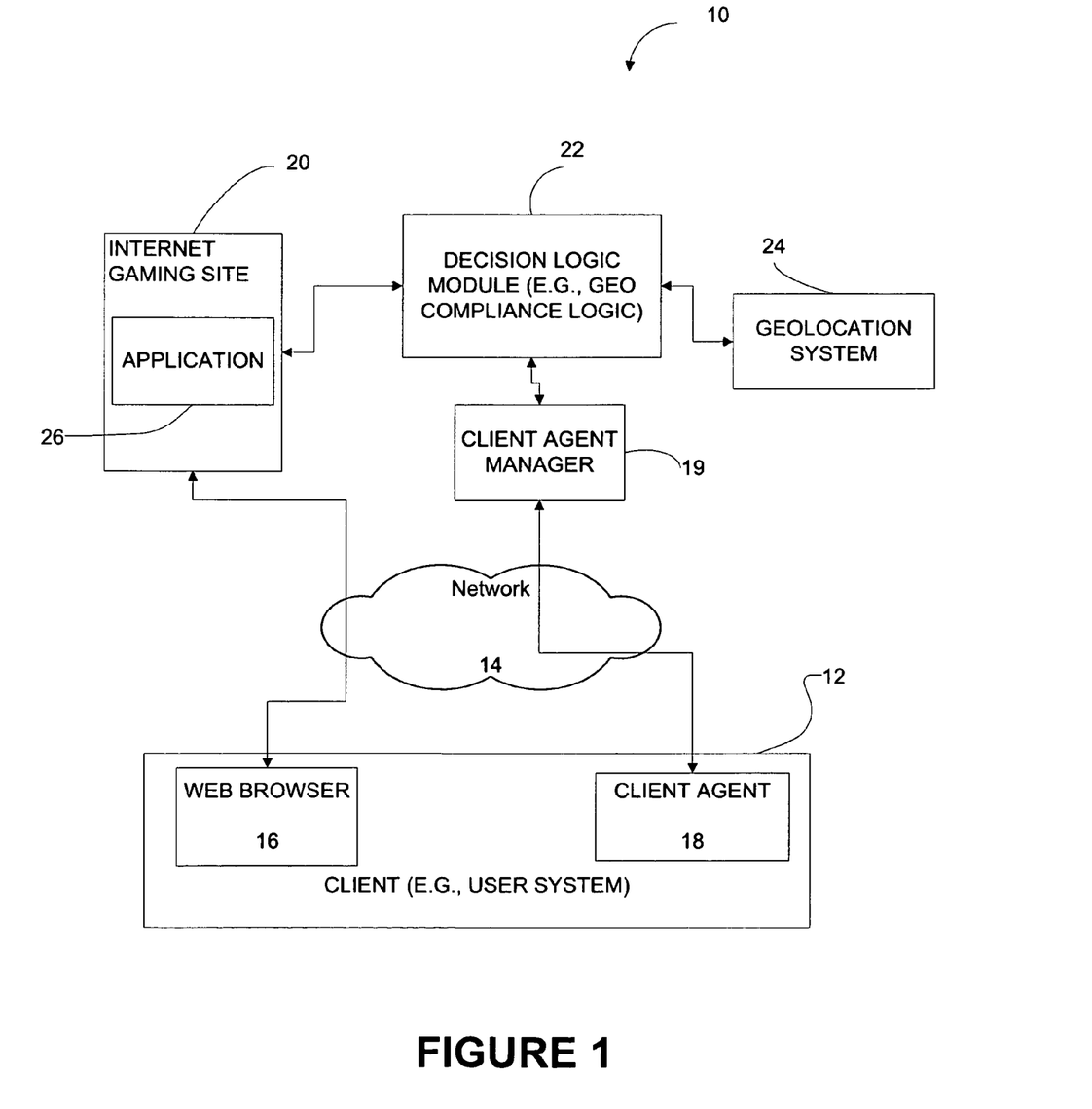
FIG. 1 is a network diagram depicting a system having a client-server architecture to estimate a geographic location of an Internet user, according to one embodiment of the present invention.

FIG. 1 illustrates a geocompliance system 10 having client-server architecture according to one embodiment of the present invention. In one embodiment, the system 10 may be referred to as a geocompliance system 10. The geocompliance system 10 may include a user system 12 connected to the server side components via a network (e.g., the Internet 14). The user system 12 may include a web browser 16 and a client agent 18. The server side components of the system 10 include an Internet site (e.g., an Internet gaming site 20), a client agent manager 19 and decision logic module 22 integrated into a web application 26 (e.g., a gaming application), and an IP geolocation system 24. In one embodiment, the IP geolocation system 24 may be hosted and operated by the same entity that hosts and operates the Internet gaming site 20. In another embodiment, the IP geolocation system 24 may be a remote service provider, which is accessible by the decision logic module 22 via a network. The client agent 18 may be capable of collecting information directly from a user system 12.

In one embodiment, the Internet gaming site 20 is responsible for all interactions with the user and for invoking and controlling top-level control over the geocompliance process. Specifically, the Internet gaming site 20 is responsible for conducting the user registration process; conducting the user log in process; maintaining user information database (e.g., including user account information); creating a unique and portable session ID for current user's session; deciding if and when to use the client agent manager 19 to download and/or invoke the client agent 18 on the user system 12; and communicating any necessary end-user agreement or privacy policy information to the user. The Internet gaming site 20 may also be responsible for invoking the decision logic module 22 with appropriate input and control parameters and performing the appropriate action with the user once the decision logic module 22 provides its assessment of the user's geographic compliance. The assessment of the user's geographic compliance may be communicated utilizing a concept of a credential. A credential may include information such as data pertinent to the user's geographic location, as well as the likelihood that the user is actually at the estimated location. Such likelihood may be expressed in the form of a reliability factor.

The decision logic module 22 may be configured to combine information from multiple sources including IP geolocation information, information collected by the client agent 18, and user supplied registration information to provide a compliance assessment of the current geographical location of the user. For example, the decision logic module 22 may compare the user's residency or payment location with the current log in location. The geocompliance system 10 may be utilized to corroborate IP geolocation information, with the client side data collection providing additional information for such corroboration. For example, user PC settings like time zone and locale can be compared to the IP geolocation. In one embodiment, additional information from HTTP headers and client side data collection may be utilized to detect proxy and firewall situations and to determine whether the proxy or the firewall obscures the location of the Internet user. In a further embodiment, additional information from client side data collection can be used to detect some dial-around situations (e.g., where a user dials into another jurisdiction), to determine location of AOL users, and to detect situations where users may be using remote desktop applications (e.g., PC Anywhere software).

The geocompliance system 10, in one embodiment, may be designed to identify the type of information that may be needed for reliable geocompliance determination. This process may be referred to as geocompliance strategy. The geocompliance system 10 may also establish a set of rules to determine whether the user's geolocation is sufficiently reliable (e.g., in order to grant access to the user). The set of rules utilized in this process may be referred to as geocompliance policies. According to one exemplary embodiment, the decision logic module 22 may have the responsibility of executing the geocompliance strategy and evaluating the geocompliance policy for the user session. In the course of doing this, the decision logic module 22 may collect additional data primitives and execute a variety of detectors 72 and detector methods.

The client agent 18, in an exemplary form of software that is downloaded to and executed on the user system 12, may be utilized to obtain information from the user's machine that is not readily available to the system 10 by virtue of the user merely connecting to the Internet gaming site 20. The client agent manager 19 may be configured to provide mechanisms to download, invoke, and communicate with the client agent 18. Specifically, the Internet gaming site 20 uses the client agent manager 19 to download and invoke the client agent 18. This is done by dynamically generating HTML snippets (e.g., invisible HTML snippets) that are embedded in web pages and that are presented to a user by the Internet gaming site 20 (e.g., as part of the log in dialogue). The process of downloading the client agent 18 may result in a security dialogue being presented to the user asking the user to accept software from the gaming site operator. Once downloaded, the invoking of the client agent 18 is invisible to the user. The decision logic module 22 uses the client agent manager 19 to communicate with the client agent 18 for collecting client-side data primitives. The client agent manager 19 may be able to optimize the communication by batching requests and caching results from the client agent 18.

The client agent 18 may be implemented as a data collection mechanism that does not contain compliance logic. Once downloaded, the client agent 18 may remain on the user system 12 (e.g., on the user's hard disk) and be available to be invoked by the client agent manager 19 the next time the user returns to the Internet gaming site 20. The client agent 18, in one embodiment, does not run (or execute) unless it is invoked by the client agent manager 19. Once invoked, it remains active and waits for commands from the client agent manager 19. The command may instruct the client agent 18 to collect and return a specific set of data primitives, including those that may require running network pings and traceroutes. Once all necessary information has been collected for that user session, the client agent manager 19 may instruct the client agent 18 to shut down.

Client Agent Manager

The client agent manager 19 is, according to one embodiment of the present invention, a server side component that may be responsible for managing interactions, communications, and control of the client agent 18. The client agent 18 can determine the compatibility of the user system 12 with the client agent 18 by looking at the user's operating system and browser type, and detecting the presence of a previously downloaded or upgraded client agent 18. The client agent manager 19 may also invoke or terminate the client agent 18. The client agent 18 may also be responsible for providing information to the client agent manager 19, to enable the client agent manager 19 to provide corresponding data primitives to the decision logic module 22.

Communication between the client agent manager 19 and the client agent 18 may include two forms. Detecting, invoking and downloading the client agent 18 may be done over HTTP using dynamically generated HTML snippets that are provided to the Internet gaming site 20 and sent to the user's web browser 16. Once invoked, all commands and data transfers between the client agent manager 19 and client agent 18 may be done over TCP with the client agent 18 initiating the TCP connection. Specifically, once invoked, the client agent 18 may establish an outbound TCP connection back to the client agent manager 19. The client agent manager 19 may then control the communication using an application protocol over the established TCP connection.

The client agent manager 19 and the client agent 18 may also use a security protocol. This security protocol operates to guarantee to the client agent 18 that the client agent manager 19 is operated by a legitimate organization (e.g., that the operator is who it claims to be); guarantee to the client agent manager 19 that the client agent 18 executable has not been modified or tampered; and encrypt all commands, information, and data that flow in either direction between the client agent manager 19 and client agent 18.

Client Agent

The client agent 18 may, in one exemplary embodiment, provide an ability to be downloaded and installed automatically on the user's machine from a web application; an ability to persist on the user's machine between user sessions (e.g., not require subsequent downloads); an ability to be invoked by a web application, which may be transparent to the user; an ability to be controlled by a server-based application; and an ability to perform any necessary operations to collect data primitives.

The client agent 18 may be implemented, for example, as a Java applet, a Java application, an ActiveX control, or utilizing native code implementations for non-Windows platforms such as, for example, Mac, Linux, and other platforms. The client agent 18 may also implement the application and security protocols described in the client agent manager section.

Decision Logic Module

Figure 2:
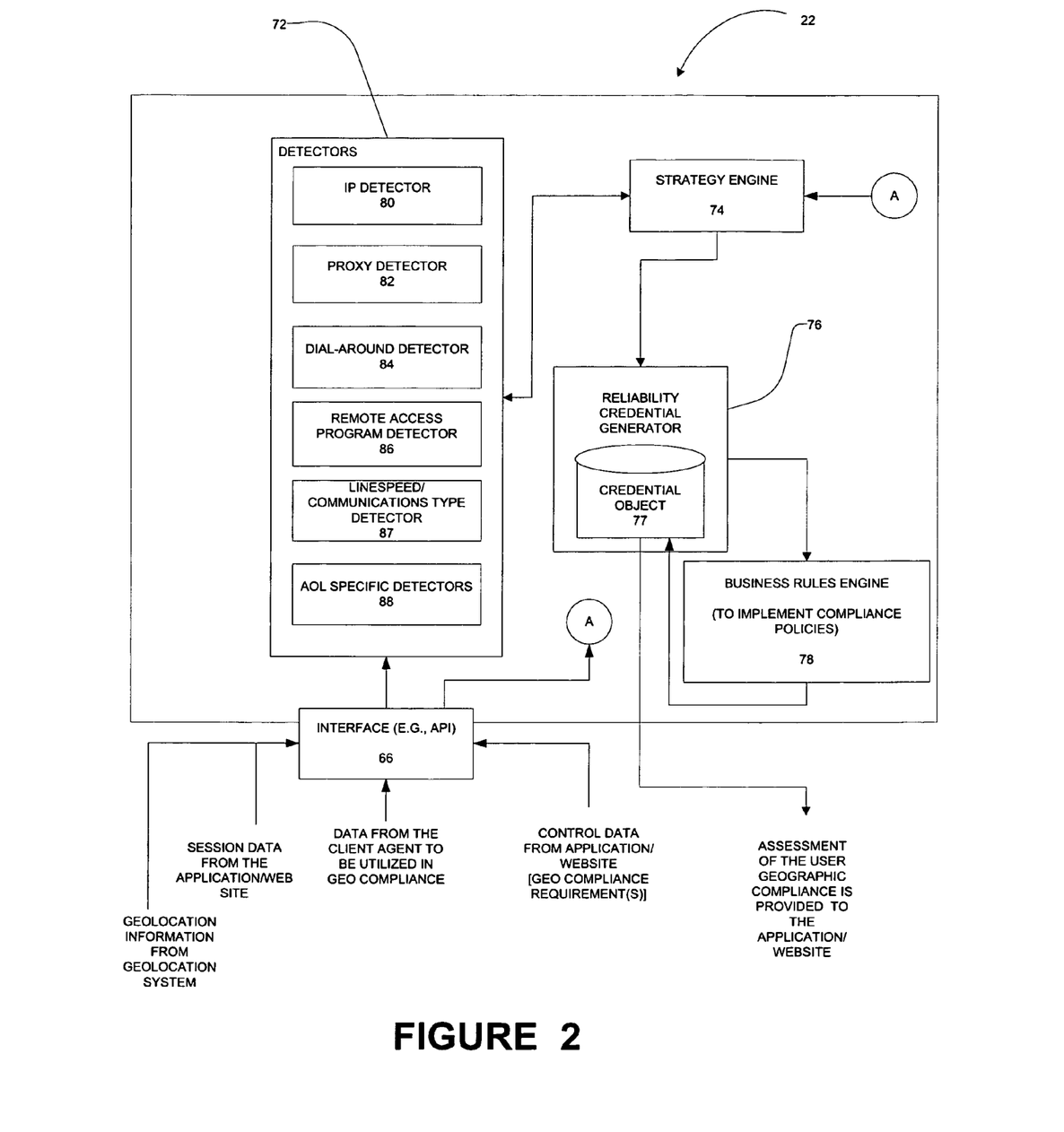
FIG. 2 is a block diagram illustrating a decision logic, according to one embodiment of the present invention.

FIG. 2 is a block diagram illustrating the components of the decision logic module 22. The decision logic module 22 may include an interface 66, one or more detectors 72, a strategy engine 74, a reliability credential generator 76, and a business rules engine 78. In operation, the decision logic module 22 receives control data from a web application, such as a gaming application 26 executing at the Internet gaming site 20. The control data includes geocompliance requirements associated with that particular application. The interface 66 receives data, e.g., from the user system, to be represented as data primitives and utilized in geocompliance process. The strategy engine 74 receives control data (e.g., also from the web application 26) and determines what information is to be collected by the detectors 72 and how that information is to be combined for further processing. The control data may include a list of allowed countries, a list of disallowed countries, instructions on whether to use the client agent 18, and other information.

Once invoked, the decision logic module 22 goes about its task of executing the embodied geocompliance strategies and policies (e.g., utilizing the strategy engine 74 and the business rules engine 78). In doing so, it may collect additional data primitives and run a variety of detectors 72. Each time the decision logic module 22 is invoked, it provides a credential object 77 back to the Internet gaming site 20. The credential object 77 is an active object and the decision logic module 22 continues to update the information contained therein throughout the execution of the geocompliance strategy and policy. Once the entire process is complete, the decision logic module 22 marks the credential object 77 as "Final".

The call to the decision logic module 22 from the Internet gaming site 20 may be asynchronous so the Internet gaming site 20 is able to check the information within the credential object 77 while the geocompliance process is taking place. If appropriate, the user may be allowed to access parts of the Internet gaming site 20 while the underlying data collection and compliance determination is taking place.

The credential object 77, in one embodiment, is a collection of all pertinent information about the user session and the compliance logic, and thus it may provide a convenient mechanism for logging information. A logging facility may be provided which includes a provision for sending information back to IP geolocation system 24. This information may allow for the analysis and diagnosis of system operations as well as providing a mechanism to drive data analysis and research into new detectors 72, detector methods and compliance logic. The operator can leverage the same information to support compliance audits.

The decision logic module 22 may communicate the results of the geocompliance process via the credential object 77. When the decision logic module 22 is invoked (e.g., for a new user session), it provides the credential object 77, associated with the user session, to the Internet gaming site 20. The credential object 77 is an active object that the decision logic module 22 continues to update. At the same time, the Internet gaming site 20 is able continuously to check the information contained within the credential object 77. This allows the decision logic module 22 to conduct geocompliance tests (e.g., a traceroute) and still allow the Internet gaming site 20 to interact with the user. Once the geocompliance processing is complete, the decision logic module 22 marks the credential as "Final", allowing the Internet gaming site 20 to proceed with the appropriate handling of the user session (e.g., allowing the user to access the Internet gaming site 20 or denying such access).

The reliability credential generator 76 receives supplemental information gathered by the detectors 72 and generates the user credential object 77 associated with the Internet user. The user credential object 77 associated with the Internet user may include the confidence factors for a number of data points or factors (e.g., whether the user is in an allowed location, whether the user is in a particular geographical location, whether the user is going through a local firewall, and other information provided by the detector 72 and other sources).

The user credential object 77 is communicated to the business rules engine 78. The business rules engine 78 may be utilized by the decision logic module 22 to implement compliance policies associated with the Internet gaming site 20. The decision logic module 22 interrogates a user credential object 77 generated by the reliability credential generator 76 and applies the business rules utilizing the business rules engine 78 in order to generate an assessment of the user's geographic compliance. Thus generated assessment may be provided to the Internet gaming site 20, which, in turn, may selectively approve or deny a request from an Internet user.

The detectors 72 may include algorithm logic that specifies types of situations and higher-level information based of the information contained in data primitives, and, in some cases, possibly the results of other detectors. A detector may access data from and write data to the user credential object 77.

The detectors 72 may include specialized detectors, such as, for example, an IP location detector 80, a proxy detector 82, a dial-around detector 84, a remote access program detector 86, and service provider (e.g., AOL) specific detectors 88. Additional types of detectors may include a firewall detector (not shown), and a line speed/connection type detector 87. The service provider specific detectors 88 may include a service provider user location detector and a service provider dial-around detector. It will be noted that, in one exemplary embodiment, one or more functionalities of two or more detectors may be combined to be performed by a single detector.

Each detector 72 may have one or more detector methods that it may use. Detector methods represent specific algorithms for detecting or determining the information. Detectors and detector methods may be configured to provide detailed information about the user's location or connection parameters. For example, the proxy detector 82 may utilize multiple methods for detecting a proxy, such as examining the Internet settings on the client computer to determine if the computer has been configured to use a proxy and examining an HTTP header to determine if a proxy has appended an indication of its existence to the header. It will be noted that some of the detector methods may rely on utilizing the client agent 18, while some methods may be utilized without the client agent 18.

General Detectors

General detectors include the IP location detector 80, the proxy detector 82, the dial-around detector 84, the remote access program detector 86, and the line speed/connection type detector 87. It will be noted that some methods may be used by more than one or all of the general detectors.

The IP location detector 80 may be utilized to determine the geography of the IP address by using the IP geolocation system 24 and correlating information available from other source (e.g., by checking consistency between the IP location and the settings on the user's computer, such as time zone and language, and router information). The consistency check may be conducted by collecting and analyzing the ping times from the user system 12 to selected web servers.

The proxy detector 82 determines if the user is utilizing some form of proxy server (e.g., including a network address translation (NAT) firewall) to access the Internet gaming site 20. The proxy detector 82 performs examination of the local IP address on the user's machine and the IP address visible to the Internet gaming site 20. If these two IP addresses are the same, then it is determined that the user is not using a proxy server. If these two IP addresses are different, the proxy detector 82 may determine if the user and the proxy server are located in the same location. This determination may be made by measuring the ping times between the user, and the client-ConnIP. Short ping times may indicate close geographical proximity between the user and the proxy. The proxy detector 82 may also (1) analyze the HTTP header of the user's request for specific codes indicating the use of a proxy server and (2) examine Internet settings on the user's machine to determine if the user's machine has been configured to utilize a proxy.

The dial-around detector 84 may be utilized to identify situations where a user is dialing long distance to a remote Point of Presence (POP). This operation may involve studying the relationship between first hop ping times and the distance to the POP called. Although this relationship may not yield an exact distance, it can be used to determine if a user is either likely to be close to the POP (e.g., within 500 miles), or likely to be further than 1500 miles away. The dial-around detector 84 may be utilized to examine the remote access service (RAS) phonebook configured on the user system 12. A significant number of configured locations (or simply multiple locations) may provide an indication of a dial-around.

The remote access program detector 86 may be utilized to determine whether client software is installed and running on the computer that is making the IP connection to the Internet gaming site 62.

The line speed/connection type detector 87 may be utilized to determine the type and speed of a connection, e.g., by exchanging predetermined file sizes and measuring the time taken to download the file, as such throughput calculation is not affected by a caching proxy.

SERVICE PROVIDER (e.g., AOL) Specific Detectors

The SERVICE PROVIDER specific detectors 88 include a SERVICE PROVIDER IP location detector, and SERVICE PROVIDER dial location detector, and SERVICE PROVIDER dial-around detector, and a SERVICE PROVIDER broadband location detector. The SERVICE PROVIDER specific detectors 88 may be utilized to specifically examine SERVICE PROVIDER users. In the prior art systems, determination of SERVICE PROVIDER user location is severely restricted: the IP geolocation system 24 may narrow down the location of each SERVICE PROVIDER user to a set of possible countries. However, with the aid of the client agent 18, the decision logic module 22 may be able to determine the location of most SERVICE PROVIDER users with a high degree of accuracy and reliability, including the country and in many cases within a state or even metropolitan area.

SERVICE PROVIDER IP Location detector studies the correlation between the residency location information provided by the user and the geographic information that can be determined from the user's IP address. This information may be used to validate the user's country. The SERVICE PROVIDER dial location detector may be utilized examine the SERVICE PROVIDER phonebook to determine the location that the SERVICE PROVIDER user actually dialed in order to make an Internet connection. This information can be used to provide a city-level geographic determination of the location of SERVICE PROVIDER users.

The SERVICE PROVIDER dial-around detector determines if a SERVICE PROVIDER user is dialing outside of his area code or country code, and provides an indication of an attempted dial-around. Finally, the SERVICE PROVIDER broadband location detector determines the location of a SERVICE PROVIDER broadband user by examining the full set of IP addresses configured on the user's machine.

The decision logic module 22 applies business rules (e.g., utilizing the business rules engine 78) to the data provided by the detectors 72 in order to provide an assessment as to whether or not an Internet user is currently within a legal jurisdiction. A credential (e.g., the credential object 77 generated by the reliability credential generator 76) may be regarded an embodiment of all information associated with assessing the geographical compliance of a single user log in session. The credential object 77 may include information such as the probability of the user being located in an allowed country, information regarding proxies and firewall, as well as raw data received by the decision logic module 22, and may be used to communicate the results of the decision logic module 22 to the rest of the system, thereby allowing the system to use any level of result, whether a final yes/no assessment or some lower level of fuzzy assessment.

Geocompliance Strategies and Policies

Conceptually, a compliance strategy generated by the strategy engine 74, determines what steps are to be taken (e.g., what data is collected and what detectors and detector methods are to be used) in order to make a compliance assessment. Compliance policy, on the other hand, may be represented by the business rules engine 78 that makes the assessment based on all currently available detector results. The resulting compliance assessment may be a yes/no answer, or the resulting compliance assessment may provide a multi-dimensional and fuzzy assessment (e.g., what is the probability that a particular Internet user is in a legal jurisdiction, or the probability that a particular Internet user is in an illegal jurisdiction). Geocompliance strategies and policies may be customized to accommodate the specific business and legal policies associated with the Internet gaming site 20.

The business rules engine 78 may be configured to determine whether, based on the credential object 77, the user's access is denied, approved, or more information is required to verify the user's location. The business rules engine 78 may also be configured to make additional determinations.

The business rules engine 78 may include several different policies that are used for different purposes. As an example, a customer may have one policy that is used when a user registers for the first time, and a second policy that is used when a user returns to access the web site. Although the business rules engine 78 may provide sample policies for both registration and access, an operator may implement any number of different policies, such as prescribed actions according to the likelihood that the user is located at a particular geographic location.

The business rules engine 78 may be configured to take control input from the Internet gaming site 20 (e.g., in the form of constraints and information) and communicate the results of applying the geocompliance policy (e.g., in the form of the credential object 77). In addition to the results of the geocompliance policy, the credential object 77 may contain any additional information deemed important by the compliance policy, including the results from each of the detectors and detector methods. The business rules engine 78 may utilize control data, such as a list of countries that are allowed, disallowed, and are considered to be a critical disallowed location.

For example, a strategy generated by the strategy engine 74 may determine if a user requesting access is an AOL user and, if so, invoke AOL specific detectors 88. If the user is not an AOL user, an instruction to run some or all of the generic detectors is provided. The policy generated by the business rules engine 78, on the other hand, may include a rule instructing the gaming application 26 to deny the user access if it was determined that the user is in a restricted country or a country that was determined to be particularly susceptible to fraud (a critical country). Another rule may direct the gaming application 26 to deny the user access if it was determined that the user is using a proxy, a dial-around method, or remote access software.

Data Primitives

In one embodiment, the data primitives in the interface 66 represent the raw data inputs into the decision logic module 22. Data primitives may include data such as, for example, IP-based information; HTTP request header information; client agent 18 information, including user PC settings, communication settings, network measurements, user account information; and derived information (e.g., information about a proxy IP address derived from the IP geolocation system 24). In one embodiment, data primitives are represented by low-level information that can be used by higher-level logic components to determine overall compliance of a specific user session. Data primitives can be obtained from multiple sources including IP protocol information, HTTP protocol information as seen by a web application (e.g., a Internet gaming application 26), information collected from the user's machine, user account information provided by the web application, derived information (e.g., geo point information about an IP address).

The following tables provide a summary of exemplary data primitives.

Table 1 lists exemplary data primitives that may be available as a result if a user connecting to the web site (e.g., the Internet gaming site 20) using a standard web browser.

TABLE 1

| Datum | Source | Comments |
| --- | --- | --- |
| HTTPConnIP | HTTP Connection | The IP address that the Internet gaming site 20 sees when a user makes an unsecured (HTTP) connection to the gaming web site using their browser |
| HTTPSConnIP | HTTPS Connection | The IP address that the Internet gaming site 20 sees when a user makes a secure (HTTPS) connection to the gaming web site using their browser |
| requestCookie | HTTP header | The cookie from the user's browser. The cookie can be set by and retrieved by the Internet gaming site 20 |
| requestLangSetting | HTTP header | Browser language setting. Used by web sites to determine what language encoding the user prefers |
| requestproxy | HTTP header | This is a set of parameters in the HTTP request header. Well behaved proxies provide information about their behavior using these parameters. However, nothing enforces their use and intentionally anonymous proxies will not use them. |
| requestUserAgent | HTTP header | The browser type and compatibility to the web site, may be used to help interpret other data primitives and to determine applicability of downloading the client agent 18. |

Table 2 lists exemplary data primitives that are available if the client agent 18 is successfully downloaded and invoked. Since the client agent 18 information requires interaction with the user system 12, it requires special considerations including user experience and user privacy policies, as well as requirements on the user's operating system, browser and computing environment.

TABLE 2

| Datum | Source | Comments |
| --- | --- | --- |
| TCPConnIP | client agent manager 19 | The IP address that server sees when the client agent 18 connects using the TCP/IP protocol, which may be different that the HTTPConnIP and HTTPSConnIP if the user is going through a proxy or firewall. |
| clientConnType | client agent 18 | A token that identifies the current Internet connection type (LAN or dial up) used by the user system 12. |
| clientDialerSettings | client agent 18 | Static information extracted from a specified dialer program. Information may include address entries, dialing parameters, location specifier, etc. There may be no enforced correlation between dialer information and the last dial string used. |
| clientLangSetting | client agent 18 | A token specifying the user language setting for the OS. |
| clientAdapterInfo | client agent 18 | A collection of parameters that describe each network adaptor. The parameters may include the IP address, host adaptor identifier, etc. |
| clientPingMillis | client agent 18 | A parameterized network measurement that can be performed by the client agent 18. Specifically, it may perform a ping from the user system 12 to the IP address specified by the client agent manager 19. Interesting IP addresses include the first hop, the HTTPConnIP and known IP address in a specified location. |
| clientProcessList | client agent 18 | A list of parameterized information that describes the current active process list on the user system 12. |
| clientproxySetting | client agent 18 | Information about the OS/browser proxy settings used for different each Internet protocol (HTTP, HTTPS, etc). |
| clientSystemGUID | client agent 18 | A unique identifier that can be used to unambiguously identify the specific installation of the client agent 18. |

TABLE 2-continued

| Datum | Source | Comments |
| --- | --- | --- |
| clientThroughput | client agent 18 | A network measurement that provides an indication of the bandwidth of the current Internet connection. |
| clientTraceroute | client agent 18 | A parameterized network measurement that can be performed by the client agent 18. Specifically, it will perform a traceroute from the user system 12 to the IP address specified by the client agent manager 19. Interesting IP addresses include the first hop, the HTTPConnIP and known IP address in a specified location. |
| clientTZSetting | client agent 18 | The current time zone setting for the OS. |

Table 3 lists exemplary derived data primitives that may be provided by IP geolocation system 24 based on a provided IP address (HTTPConnIP, HTTPSConnIP or TCPConnIP). While the IP geolocation system 24 is able to provide a wide variety of information, the following fields are useful for compliance determination.

TABLE 3

| Datum | Source | Comments |
| --- | --- | --- |
| Country | IP geolocation system 24 | IP geolocation system 24 provides the country location associated with an IP address (e.g., ISO country code designator). |
| State | IP geolocation system 24 | IP geolocation system 24 provides the state/province location associated with an IP address. |
| City/Postal Code | IP geolocation system 24 | IP geolocation system 24 provides the city location associated with an IP address. Along with the city name is a postal/zip code that can be used as an index to the city name (may not indicate the specific postal code of the user). |
| Confidence Factor | IP geolocation system 24 | IP geolocation system 24 provides a confidence factor (CF) with each country, state and city result. The CF may be represented by a number between 1 and 99 that provide a relative assessment of confidence that the answer is correct. |
| IPRoutingmethod | IP geolocation system 24 | The IPRoutingmethod identifies different situations (including service provider specific information (e.g., that a user is an AOL user) that may indicate that the user location is potentially not the same as the IP location. Specific values and their meanings are provided in the IP geolocation system 24 documentation. |
| ConnectionSpeed | IP geolocation system 24 | IP geolocation system 24 provides an indicator of connection speed (e.g., high, medium, and low) associated with the IP address. |

In addition, the Internet gaming site 20 can provide information about the user and user account to the decision logic module 22. The specific information provided can be included during the customization of the decision logic module 22. Examples of information that may be provided are described in Table 4.

TABLE 4

| Datum | Source | Comments |
| --- | --- | --- |
| UserID | Registration | An account identifier for the user's account. This may be used to maintain a correlation in log information between subsequent user sessions. |
| ResidencyLoc | Registration | The country, state and city of residency that the user provided during the registration process. This can be correlated with the current session location |

TABLE 4-continued

| Datum | Source | Comments |
| --- | --- | --- |
| PaymentLoc | Registration | The country, state and city, if available, associated with the payment method provided by the user. This can be correlated with the current session location |
| PreviousLocations | Account History | A list of previous locations from which the user has connected. This may provide some sense of past user behavior to the compliance logic |
| PreviousGUID | Account History | If the client agent 18 was previously downloaded, the system could maintain a history of the clientSystemGUID (e.g., an identification of a specific machine) to determine whether the user is accessing the site from the same or different machine. |

Figure 3:
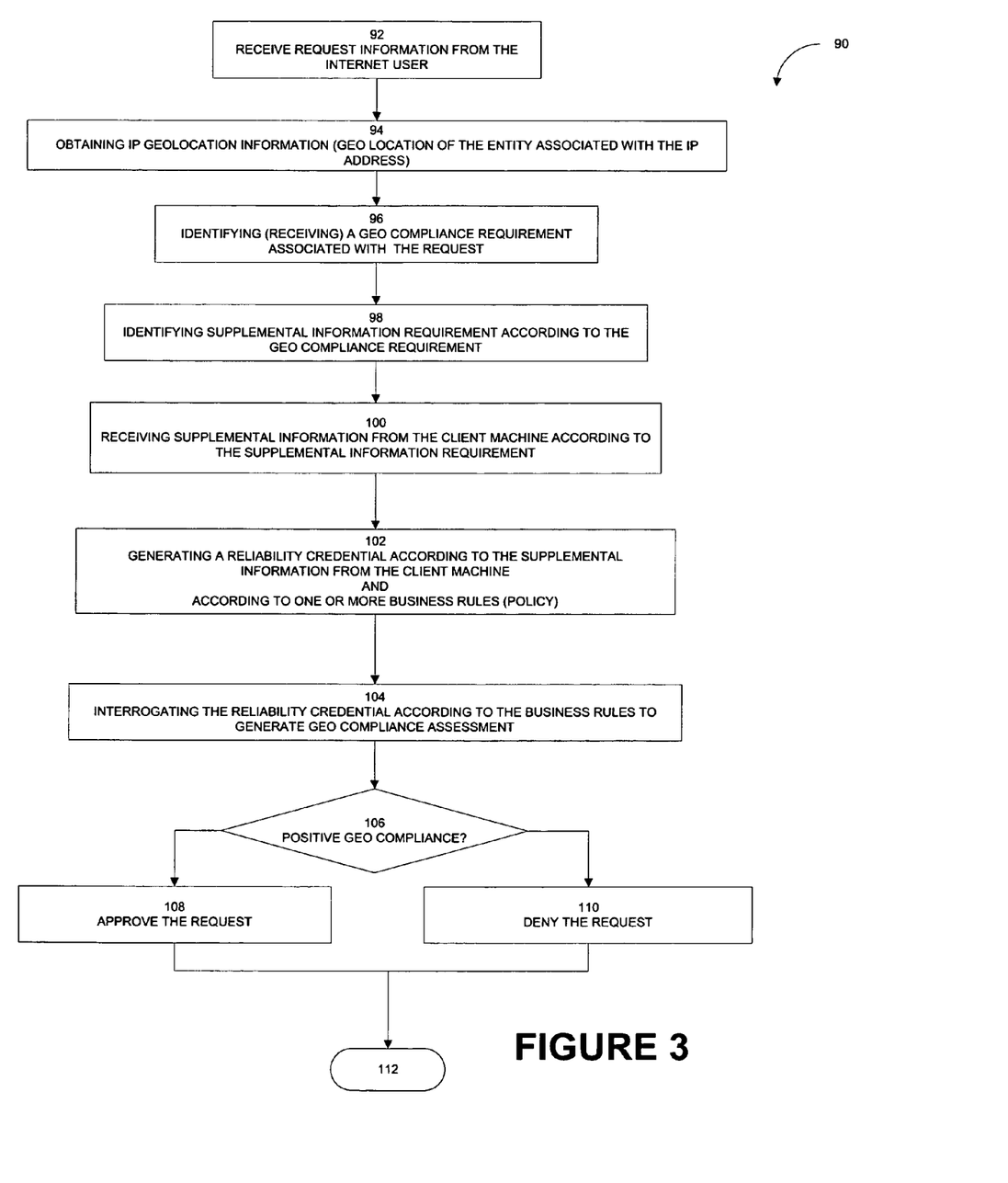
FIG. 3 is a flowchart illustrating a method to estimate a geographic location of an Internet user, according to one embodiment of the present invention.

FIG. 3 is a flowchart illustrating a method 90 to estimate a geographic location of an Internet user according to one embodiment of the present invention.

At operation 92, the decision logic module 22 receives information pertaining to a request received from an Internet user at a web application (e.g., the application 26). For example, the application 26, responsive to a registration session or a user session log on, may provide a set of input parameters to the decision logic module 22. As noted above, this information may include an observed IP address, HTTP request header information, and information from a user account database (e.g., a registered address or location implied by a payment method) maintained or accessible by the application 26. In an alternative embodiment, a session request received from an Internet user at the web application 26 may be redirected to the decision logic module 22, so as to enable the decision logic module 22 to harvest the above discuss information.

At operation 94, the decision logic module 22 obtains IP geolocation information (e.g., a geographical location of the entity associated with the IP address utilized by the Internet user) from the geolocation system 24. The IP geolocation information may be provided by the geolocation system 24 to the decision logic module 22, responsive to a communication of the IP address utilized by the Internet user from the decision logic module 22 to the geolocation system 24. The geolocation system 24 may maintain a database mapping IP addresses (or blocks of IP addresses) to geographic locations. In another embodiment, the geolocation system 24 may, responsive to receipt of the IP address from the decision logic module 22, dynamically perform a number of operations to determine a geographic location associated with the IP address. Further details regarding operations that may be performed by the geolocation system 24 in order to estimate a geographic location associated with an IP address are provided in U.S. Pat. No. 6,684,250.

At operation 96, the decision logic module 22 receives a geographic compliance requirement associated with the request from a relevant application (e.g., the gaming application 26). The geographic compliance requirement may be defined and provided by the Internet gaming site 20, for example. In one embodiment, the geographic compliance requirement may comprise control information, including for example a list of allowed and/or disallowed locations (e.g., specific to the gaming application 26), as well as constraints on data collection operations that are performed by the client agent 18 on the user system 12. For example, the constraints might restrict data collection activities that impact the user experience, or present privacy issues. Consider that a trace route may require up to 20 seconds to complete, and may thus only be allowed in certain situations.

At operation 98, the strategy engine 74 identifies supplemental information required according to the geographic compliance requirement provided (e.g., by the Internet gaming site 20).

At operation 100, the detectors 72 proceeded to initiate the collection, storage and/or processing of supplemental information associated with the Internet user. The supplemental information may be received in accordance with the supplemental information requirement generated by the strategy engine 74. The supplemental information may include information associated with the user system 12, and the information received at operation 92 (e.g., the information collected from the HTTP header associated with the Internet user's request). The supplemental information may further include information associated with the Internet user obtained in the process of the registration of the Internet user.

The operation 100 may include deploying one or more appropriate detectors from the detectors 72, according to the instructions generated by the strategy engine 74. Specifically, the various detectors 72 may be employed to invoke the client agent 18 to collect and communicate relevant supplemental information, subject to constraints that may have been specified in the control information communicated from the application 26 to the decision logic module 22.

At operation 102, the reliability credential generator 76 generates a reliability credential object 77, based at least partially on the supplemental information, (e.g., utilizing supplemental information obtained from the client machine by the detectors 72).

At operation 104, the credential object 77 generated by the reliability credential generator 76 is interrogated according to the business rules, as embodied in the business rules engine 78, in order to generate a geographic compliance assessment for the Internet user (or at least the Internet user session).

In one embodiment, if it is determined, at operation 106, that the Internet user complies with the geographic compliance requirements associated with the Internet gaming site 20, then the decision logic module 22 approves the request of the Internet user at operation 108. It will be noted that a positive determination at the operation 106 may be represented by identifying the geographical location of the Internet user as corresponding to the geolocation of the entity associated with the IP address.

Responsive to a negative determination at operation 106, the request of the Internet user is denied at operation 110. The method 90 terminates at operation 112. While the method 90 as been discussed with reference to a "yes/no" assessment, it will be appreciated that the assessment outputted by the decision logic module 22, and provided to the application 26, may be less definite, and provide information that enables the application 26 itself to process a user interaction in a specific manner. For example, the assessment may indicate whether the relevant user is located in a legal jurisdiction for service being offered by the application 26. The assessment may also, for example, provide a multi-dimensional and fuzzy assessment (e.g., what is the possibility that the user is in a legal jurisdiction and likewise the possibility that they are in an illegal jurisdiction). As noted in this document, the assessment may be accompanied by a confidence factor, indicating a possibility or likelihood that an indicated the assessment is valid.

As noted, the assessment is communicated from the decision logic module 22 to the application 26. In one embodiment, the assessment is communicated utilizing the credential object 77 discussed above. For example, by querying the credential object 77, the application 26 can ask and have the following questions answered:

Where is the user most likely located?
Is the user located in X?
What is the "likelihood" that the user is in:
 an Allowed Location?
 a Disallowed Location?
 a Critical Disallowed Location?
Based on the compliance policy, is the user allowed to access the site 20 from the day current location?
Has the decision logic module 22 completed processing all information?

The architecture allows for essentially any other question to be asked of the credential object 77, as long as the corresponding compliance logic has been implemented (e.g., the operator of the site 20 can create a compliance honestly that provides other forms of evaluation). The decision logic module 22 may, in one embodiment, be implemented as a set of J2EE compliant Java classes.

Figure 4:
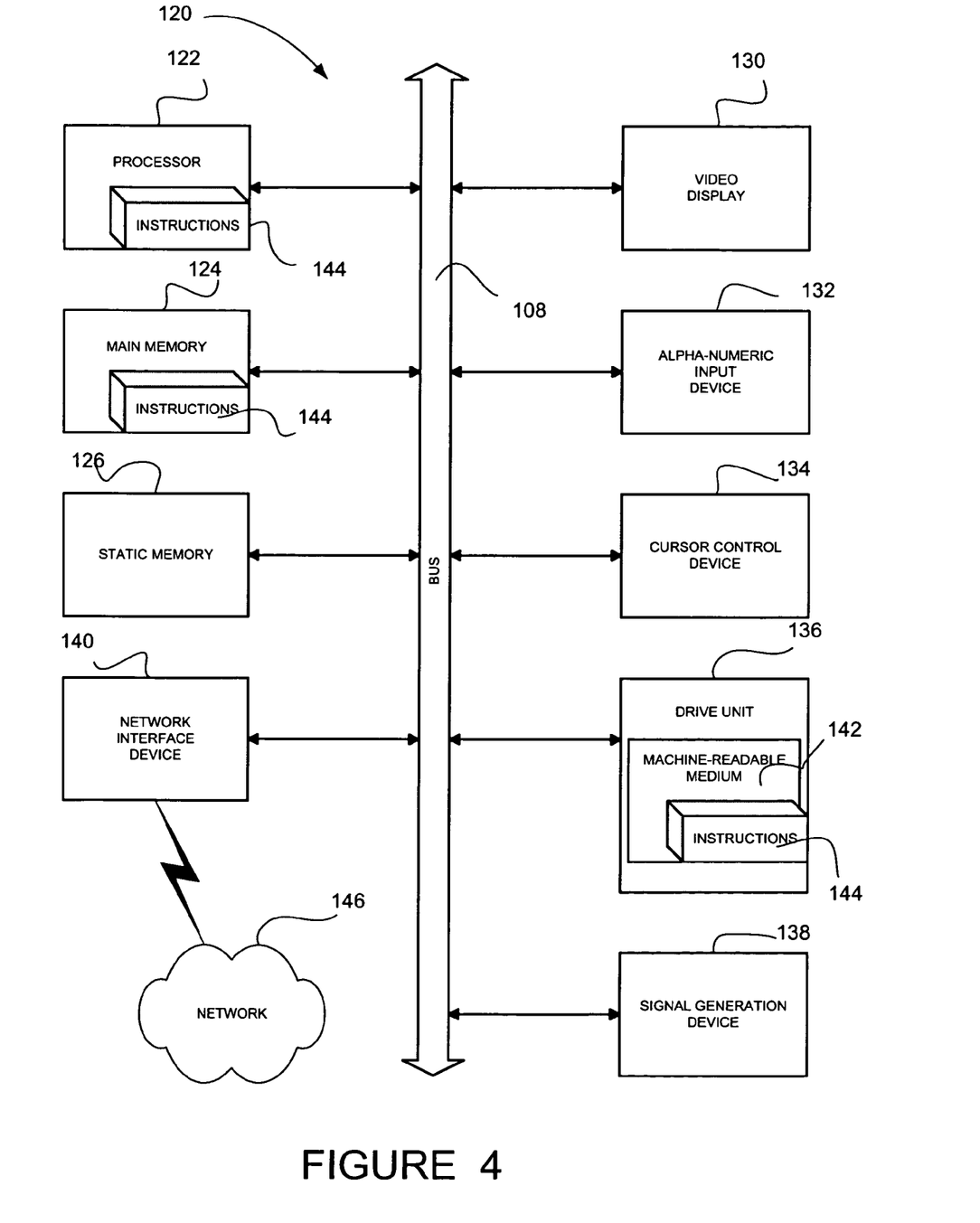
FIG. 4 is a diagrammatic representation of a computer system, within which a set of instructions, for causing the machine to perform any one or more of the methodologies discussed herein, may be executed.

FIG. 4 shows a diagrammatic representation of machine in the exemplary form of a computer system 120 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 120 includes a processor 122 (e.g., a central processing unit (CPU) a graphics processing unit (GPU) or both), a main memory 124 and a static memory 126, which communicate with each other via a bus 128. The computer system 120 may further include a video display unit 130 (e.g., a liquid crystal display (LCD) or a cathode ray tube (CRT)). The computer system 120 also includes an alphanumeric input device 132 (e.g., a keyboard), a cursor control device 134 (e.g., a mouse), a disk drive unit 136, a signal generation device 138 (e.g., a speaker) and a network interface device 140.

The disk drive unit 136 includes a machine-readable medium 142 on which is stored one or more sets of instructions (e.g., software 144) embodying any one or more of the methodologies or functions described herein. The software 144 may also reside, completely or at least partially, within the main memory 124 and/or within the processor 122 during execution thereof by the computer system 120, the main memory 124 and the processor 122 also constituting machine-readable media.

The software 144 may further be transmitted or received over a network 146 via the network interface device 140.

While the machine-readable medium 142 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical and magnetic media.

Thus, a method and system to facilitate geocompliance have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A computer-implemented system including:
 a first interface to receive network geolocation information associated with a first entity that is a party to a network session between the first entity and a second entity, coupled via a network, wherein the network geolocation information is determined utilizing a network address of the first entity;
 a second interface to an agent resident at the first entity, the agent providing access to supplemental information at the first entity that is not readily available via the network, the agent being a client resident agent configured to obtain supplemental information directly at a client entity; and
 a decision logic module, executable by a processor, to obtain the supplemental information concerning the first entity from the agent via the second interface, the agent harvesting the supplemental information locally at the first entity, wherein the decision logic module is further to generate an assessment regarding the first entity's compliance with a geolocation policy defined in connection with access to the second entity by the first entity, the assessment being generated utilizing the network geolocation information and the supplemental information, the geolocation policy including rules to determine whether the first entity's geolocation is sufficiently reliable.

2. The system of claim 1, wherein the first entity is a client machine hosting a client application, and the second entity is a server machine hosting a server application, the client application communicating with the server application using the network session.

3. The system of claim 2, wherein the supplemental information includes at least one of a group of information types including a machine setting on the client machine, a communication setting with respect the network session between the client machine and the server machine, and network measurements pertaining to the network session between the client machine and the server machine.

4. The system of claim 1, wherein the geolocation policy is defined by an operator of the second entity.

5. The system of claim 1, wherein the decision logic module is to obtain further supplemental information, concerning the first entity, from the second entity and is to generate the assessment utilizing the further supplemental information.

6. The system of claim 5, wherein the further supplemental information includes information concerning a user associated with the first entity, provided to the second entity by the first entity and stored by the second entity.

7. The system of claim 6, wherein the further supplemental information includes at least one of a group of information types including user login information, user account information and network session information received at the second entity from the first entity.

8. The system of claim 1, wherein the first interface is to receive the network geolocation information from an external geolocation service to which the network address of the first entity has been communicated.

9. The system of claim 1, wherein the agent to harvest the supplemental information locally at the first entity subject to constraints.

10. A computer-implemented method including:
    receiving network geolocation information associated with a first entity that is a party to a network session between the first entity and a second entity, coupled via a network, wherein the network geolocation information is determined utilizing a network address of the first entity;
    providing an agent resident at the first entity, the agent providing access to supplemental information at the first entity that is not readily available via the network, the agent being a client resident agent configured to obtain supplemental information directly at a client entity;
    obtaining the supplemental information concerning the first entity from the agent, the agent harvesting the supplemental information locally at the first entity; and
    generating an assessment regarding the first entity's compliance with a geolocation policy defined in connection with access to the second entity by the first entity, the assessment generated utilizing the network geolocation information and the supplemental information, the geolocation policy including rules to determine whether the first entity's geolocation is sufficiently reliable.

11. The computer-implemented method of claim 10, wherein the first entity is a client machine hosting a client application, and the second entity is a server machine hosting a server application, the client application communicating with the server application using the network session.

12. The computer-implemented method of claim 10, wherein the supplemental information includes at least one of a group of information types including a machine setting on the client machine, a communication setting with respect the network session between the client machine and the server machine, and a network measurement pertaining to the network session between the client machine and the server machine.

13. The computer-implemented method of claim 10, wherein the geolocation policy is defined by an operator of the second entity, the method including receiving the geolocation policy from the second entity.

14. The computer-implemented method of claim 10, including obtaining further supplemental information, concerning the first entity, from the second entity and generating the assessment utilizing the further supplemental information.

15. The computer-implemented method of claim 14, wherein the further supplemental information includes information concerning a user associated with the first entity, provided to the second entity by the user and stored by the second entity.

16. The computer-implemented method of claim 15, wherein the further supplemental information includes at least one of a group of information types including user login information, user account information and network session information received at the second entity from the first entity.

17. The computer-implemented method of claim 10, including receiving the network geolocation information from an external geolocation service to which the network address of the first entity has been communicated.

18. The computer-implemented method of claim 10, including receiving constraints, from the second entity, in connection with the harvesting of the supplemental information locally at the first entity, and the agent harvesting the supplemental information locally at the first entity subject to the constraints.

19. A machine-readable medium embodying a set of instructions that, when executed by a machine, cause the machine to:
    receive network geolocation information associated with a first entity that is a party to a network session between the first entity and a second entity, coupled via a network, wherein the network geolocation information is determined utilizing a network address of the first entity;
    provide an agent resident at the first entity, the agent providing access to supplemental information at the first entity that is not readily available via the network, the agent being a client resident agent configured to obtain supplemental information directly at a client entity;
    obtain the supplemental information concerning the first entity from the agent, the agent harvesting the supplemental information locally at the first entity; and
    generate an assessment regarding the first entity's compliance with a geolocation policy defined in connection with access to the second entity by the first entity, the assessment generated utilizing the network geolocation information and the supplemental information, the geolocation policy including rules to determine whether the first entity's geolocation is sufficiently reliable.

20. A computer-implemented system including:
    means for receiving network geolocation information associated with a first entity that is a party to a network session between the first entity and a second entity, coupled via a network, wherein the network geolocation information is determined utilizing a network address of the first entity;
    means for providing an agent resident at the first entity, the agent providing access to supplemental information at the first entity that is not readily available via the network, the agent being a client resident agent configured to obtain supplemental information directly at a client entity;
    means, executable by a processor, for obtaining the supplemental information concerning the first entity from the agent, the agent harvesting the supplemental information locally at the first entity; and
    means for generating an assessment regarding the first entity's compliance with a geolocation policy defined in connection with access to the second entity by the first entity, the assessment being generated utilizing the network geolocation information and the supplemental information, the geolocation policy including rules to determine whether the first entity's geolocation is sufficiently reliable.

* * * * *